US006058299A

United States Patent [19]

Lyseng

[11] Patent Number: 6,058,299

[45] Date of Patent: May 2, 2000

[54] REMOTE TELECOMMUNICATIONS ASSEMBLY

[76] Inventor: Merlin Lyseng, 2875 Shannon Place, Westbank, British Columbia, Canada, V4T 1T5

[21] Appl. No.: 08/965,973

[22] Filed: Nov. 7, 1997

[51] Int. Cl.[7] .......... H04Q 7/30

[52] U.S. Cl. .......... 455/347; 455/561; 52/27.5

[58] Field of Search .......... 455/90, 575, 347–349, 455/550, 561; 379/106.01, 106.03, 106.04; 52/27.5, 40, 296, 294, 297; 256/14, 59; 124/52.1; 361/600, 601, 664

[56] References Cited

U.S. PATENT DOCUMENTS

| | | | |
|---|---|---|---|
| 4,386,762 | 6/1983 | Collins | 256/59 |
| 4,649,675 | 3/1987 | Moldovan et al. | 52/40 X |
| 5,288,058 | 2/1994 | Russell | 256/69 |
| 5,546,444 | 8/1996 | Roach, Jr. et al. | 455/412 |
| 5,560,150 | 10/1996 | Pearson | 52/294 X |
| 5,581,958 | 12/1996 | Cote | 52/40 |
| 5,611,176 | 3/1997 | Juengert et al. | 52/40 |
| 5,631,636 | 5/1997 | Bane | 340/825.69 |
| 5,649,402 | 7/1997 | Moore | 52/40 X |
| 5,710,804 | 1/1998 | Bhame et al. | 455/561 |
| 5,747,734 | 5/1998 | Kozlowski et al. | 174/50 |
| 5,904,004 | 5/1999 | Hill | 52/40 |

*Primary Examiner*—William G. Trost

*Attorney, Agent, or Firm*—George A. Seaby

[57] ABSTRACT

A remote telecommunications assembly for use at a gas wellhead or other remote location includes a base formed of concrete curb sections, a steel frame mounted on the base and one or more masts mounted on the steel frame for carrying the electronic components of the assembly, batteries, a solar panel and an antenna for transmitting and receiving signals.

9 Claims, 5 Drawing Sheets

33 34 17 18 32 29 31 35 28 27 16 13 12 14 20 23 10 12 13 7 11 2 6 7 3 6 1 4 11 6 3 10

33
34
17
18
32
29
31
35
28
27
16
13
12
14
20
23
10
12
13
11
7
2
6
7
3
6
1
4
11
6
3
10

34
33
41
35
16
43
44
45
40
37
37
38
3
7
4
7
6
6
38
1
4
6
7
3
38

48
50
49
53
4
3
16
18
50
52
17
35
56
2
52
57
53
55
49
57
50
49

REMOTE TELECOMMUNICATIONS ASSEMBLY

BACKGROUND OF THE INVENTION

1. Field of the Invention

This invention relates to a remote telecommunications assembly.

While the assembly of the present invention was designed specifically for gas well flow measuring, control and alarm monitoring, it will be appreciated that the assembly can be used at any remote site requiring electronic measuring control and/or monitoring.

2. Discussion of the Prior Art

The assembly described herein was developed to satisfy a need to reduce the cost of installing electronic gas well flow measuring, control and alarm monitoring apparatuses. Because of the high cost of existing methods of installing such apparatuses, remote access to such facilities using electronic means has been reserved for only high production natural gas wells because of the high cost of existing methods of installing such apparatuses.

GENERAL DESCRIPTION OF THE INVENTION

Thus, an object of the present invention is to provide a remote telecommunications assembly which is universal, being able to accommodate the products of most remote telecommunications equipment manufacturers.

Another object of the invention is to provide a relatively simple remote telecommunications assembly, which is inexpensive and easy to install. By reducing the cost of the overall installation, the threshold of well production that justifies installation of remote telecommunications equipment is lowered. This is important to owners and regulatory agencies alike, both of whom require better information on gas production and non-renewable resources management.

Accordingly, the invention relates to a remote telecommunications assembly comprising a modular base for installation at a monitoring site, said base including interconnectable, concrete curb sections for defining a floating concrete pad; a skeletal frame for mounting on said base; a power supply for mounting on said frame; a remote telecommunications unit for mounting on said frame; and an antenna for mounting on said frame for receiving and transmitting signals from said remote telecommunications unit.

BRIEF DESCRIPTION OF THE DRAWINGS

The invention is described hereinafter in greater detail with reference to the accompanying drawings, which illustrate preferred embodiments of the invention, and wherein.

DESCRIPTION OF THE PREFERRED EMBODIMENT

Figure 1:
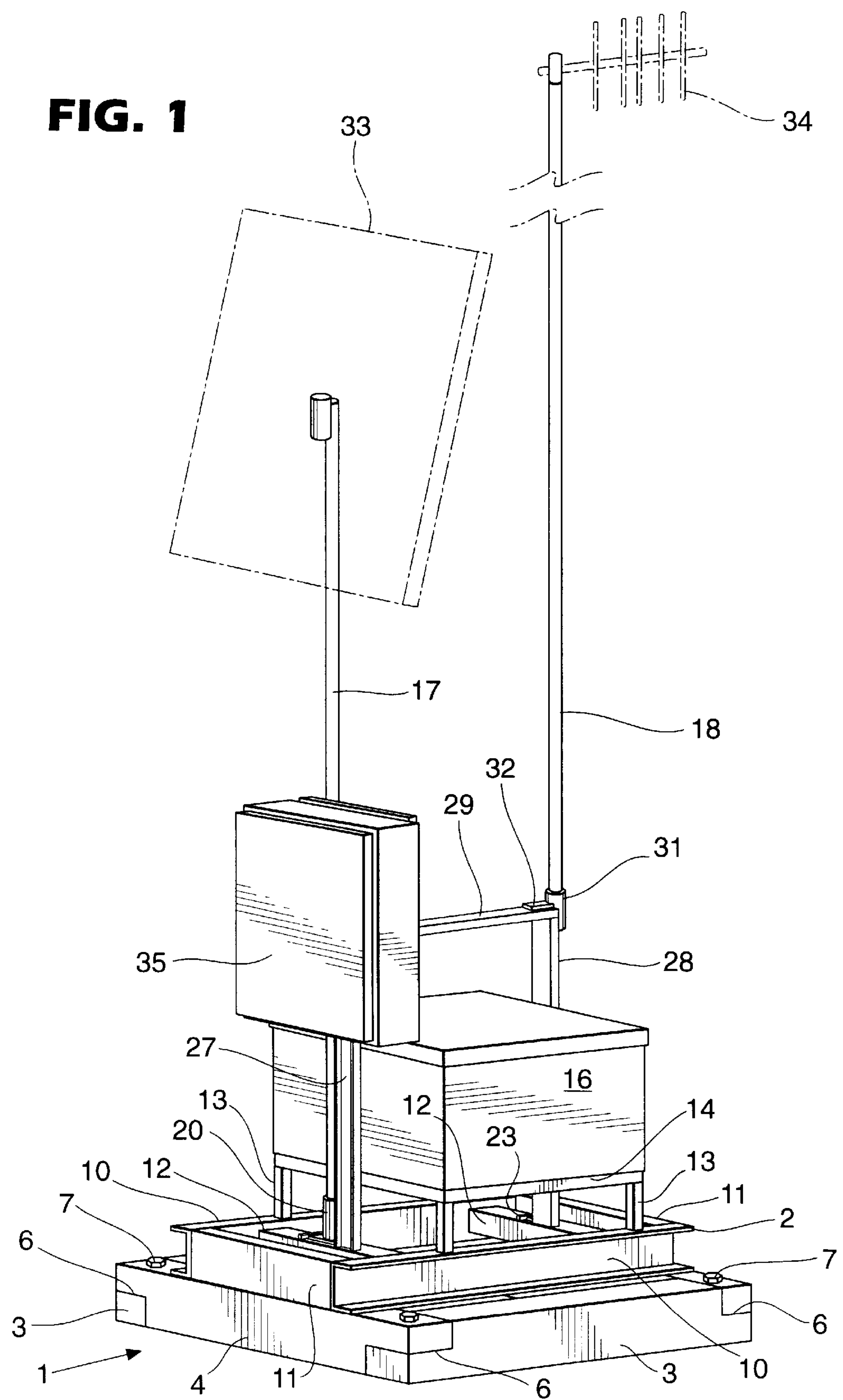
FIG. 1 is a schematic isometric view of a remote telecommunications assembly in accordance with the invention.
Figure 2:
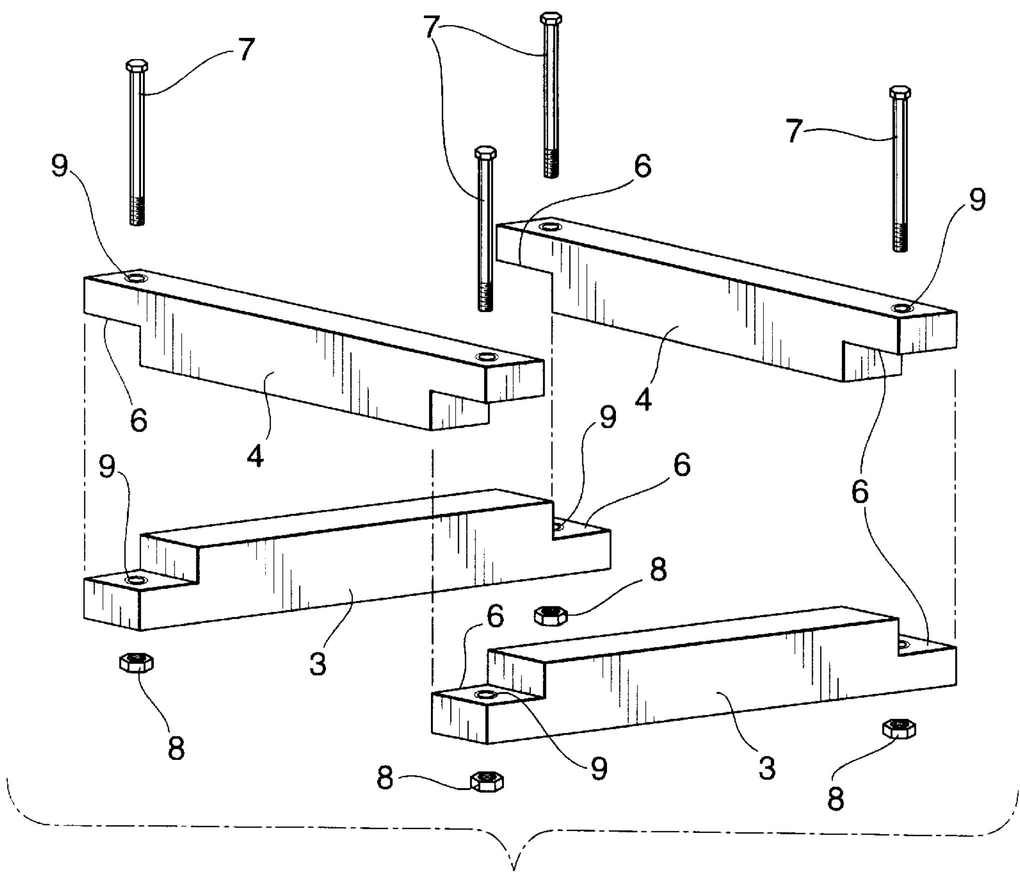
FIG. 2 is an exploded isometric view of the base of the assembly of FIG. 1.

Referring to FIGS. 1 to 4, the remote telecommunications assembly of the present invention includes a modular, skeletal base generally indicated at 1 carrying a skeletal frame 2. The base 1 is formed of four narrow concrete curb sections defining sides 3 and ends 4 around a hollow center. Shoulders 6 are provided at the ends of each curb section so that the lap joints can be formed between the sides 3 and the ends 4 of the base. As best shown in FIG. 2, the sides 3 and ends 4 are held together by bolts 7 and nuts 8. Reinforcing sleeves 9 are provided in the sides 3 and the ends 4 for receiving the bolts 8. The finished base performs like a cast-in-place floating concrete pad. Thus, on site form production and concrete mixing are avoided while adequate mass is provided to ensure stability of the structure. Moreover, it is easy to re-level the structure should movement occur after installation, and the structure is easy to remove for reuse at another location.

Figure 3:
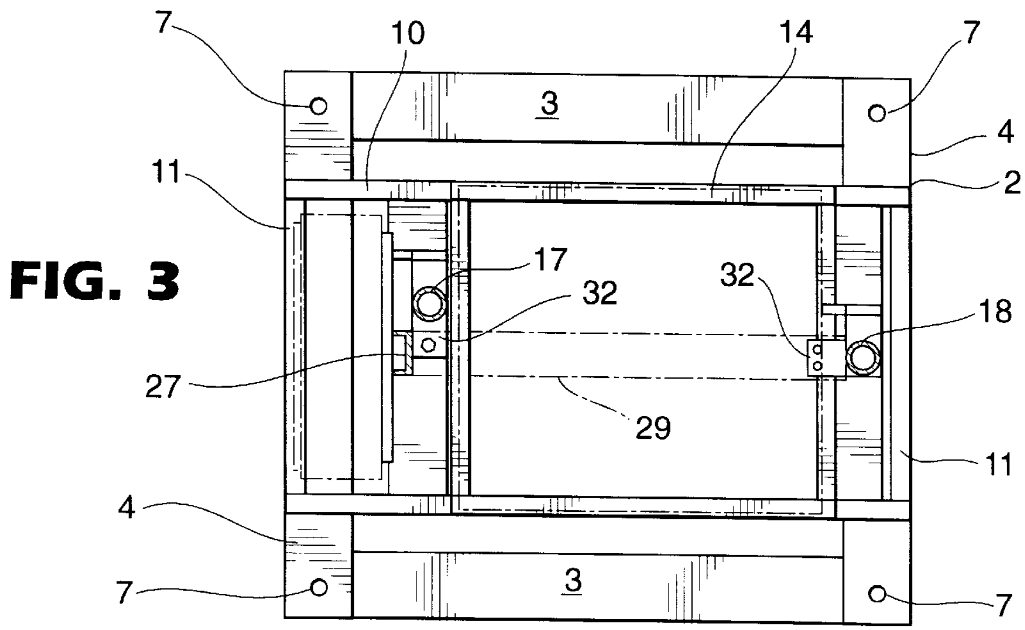
FIG. 3 is a partly sectioned top view of the assembly of FIG. 1.
Figure 4:
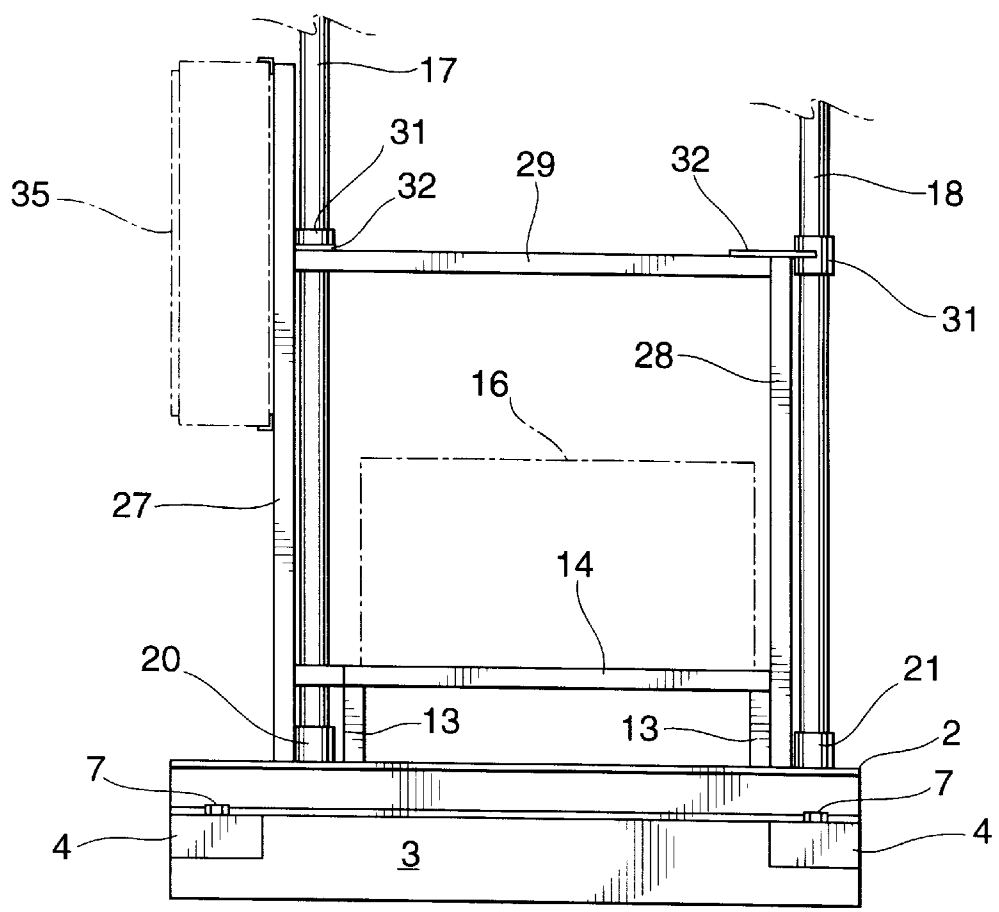
FIG. 4 is a side view of the bottom portion of the assembly of FIGS. 1 and 3.
Figure 5:
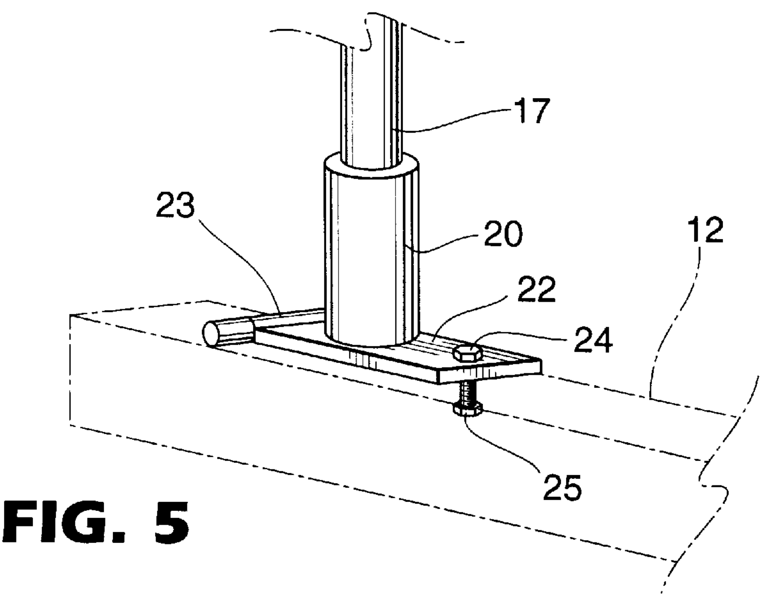
FIG. 5 is an isometric view of a mast support socket used in the assembly of FIGS. 1 and 3.

The frame 2 includes a rectangular bottom section or base constructed with steel C-channel members defining a pair of sides 10, ends 11 and crossbars 12 extending between the sides 10. A platform including legs 13 and a top 14 is mounted on the sides 10 of the base for supporting a battery box 16, which forms part of the power supply for the assembly. As best shown in FIG. 3, the top 14 of the platform is a rectangle of tubular steel. The frame 2 also supports a pair of masts 17 and 18. For such purpose, sockets 20 and 21 are mounted on the crossbars 12. Each of the sockets 20 and 21 is mounted on a plate 22 (FIG. 4) which is connected to the crossbar 12 by a hinge 23 at one end, and by a bolt 24 and a nut 25 at the other end. By removing the bolt 24, the mast 17 or 18 can be rotated around the horizontal axis of the hinge 23 to facilitate erection of the mast and access to the top of the mast. During assembly, the bottom end of the mast 17 or 18 is placed in the socket 20 or 21, and the mast is easily pushed into the vertical position. By tilting the mast 17 or 18 downwardly, the solar panels can readily be accessed for cleaning or replacement.

The mast structure is reinforced by a top portion of the frame defined by a pair of posts 27 and 28 interconnected a crossbar 29. Brackets defined by collars 31 on the mast 17 and 18 and a plate 32 secure the masts to the crossbar 29 of the frame. The mast 17 carries a solar panel 33, the mast 18 carries an antenna 34, and the post 27 carries the remainder of the remote telecommunications unit, i.e. a box 35 containing the off-the-shelf electronic well flow monitoring, control and alarm components of the assembly.

Figure 6:
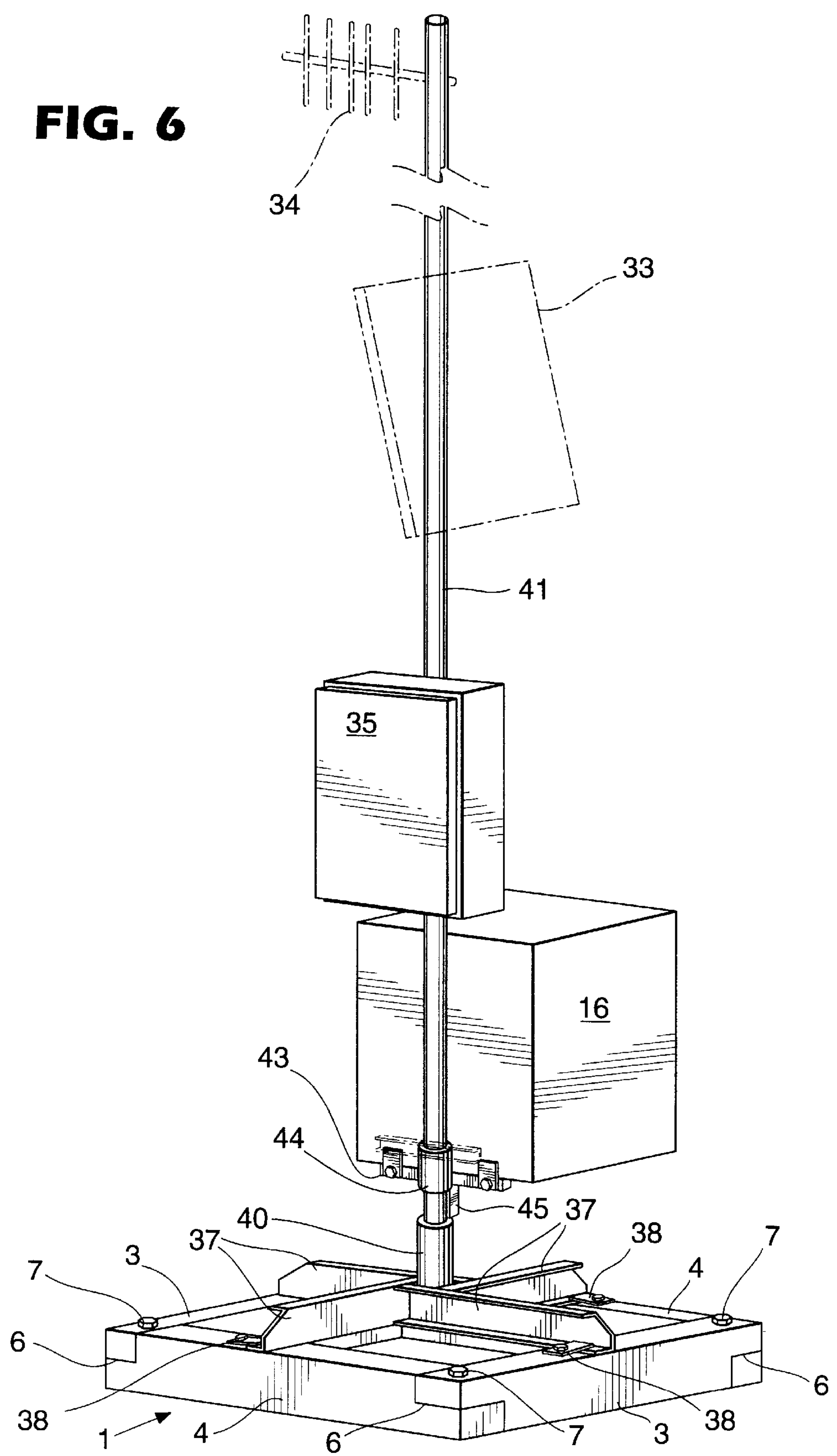
FIG. 6 is an isometric view of a second embodiment of the assembly of the present invention.

Referring to FIG. 6, a second embodiment of the invention includes a base generally indicated at 1, which is similar to the base employed in the embodiment of the invention illustrated in FIGS. 1 to 3. The skeletal frame in this case is defined by a generally cruciform base formed by four interconnected feet 37, which are connected to the sides 3 and the ends 4 of the base 1 by tie down plates or brackets 38. A well at the centre of the feet 37 receives a socket 40, which supports a single mast 41.

The mast 41 carries the battery box 16, the solar panel 33, the antenna 34 and the box 35 containing the electronic components of the assembly. For such purpose, a shelf is provided on the mast 41 a short distance from the socket 40. The shelf is defined by a T-shaped assembly 43 of tubular steel connected to a collar 44, which is mounted on the mast 41 using a set screw (not shown). A leg 45 extends downwardly from the collar 44 to the top of the socket 40 for providing additional support for the shelf.

Figure 7:
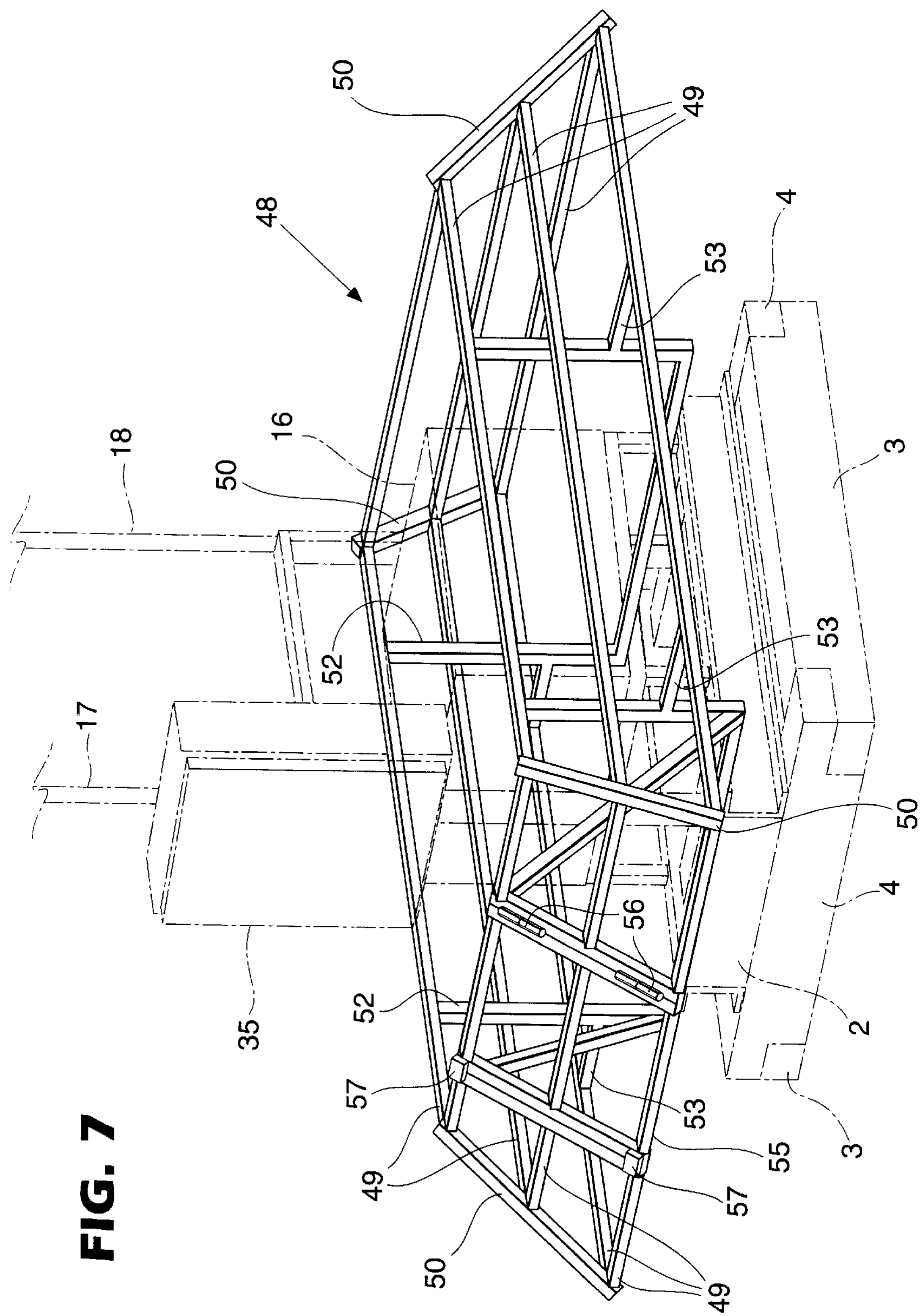
FIG. 7 is an isometric view of a livestock guard used with the assembly of the present invention.

With reference to FIG. 7, the assembly may include a livestock guard generally indicated at 48 which deters livestock from using the assembly as a scratching post, or from damaging cables or other components of the structure. The guard 48 is a skeletal, tubular steel, frusto-pyramidal frame defined by a plurality of rails 49 interconnected by corner posts 50. A pair of generally U-shaped feet 52 support the frame on the base of the frame 2. The feet 52 extend downwardly from top rails 49, and are connected to bottom rails by reinforcing crossbars 53. A gate 55 is provided in one end of the guard. One side of the gate 55 is connected to the remainder of the end of the guard by hinges 56, and latches 57 are provided on the other side of the gate.

While not shown, an electronic guard can also be provided for keeping bears away from the assembly. The electronic guard consists of three steel wires strung on a steel tubing frame attached to the base 1. The wire is electrically pulsed with up to 3,000 volts, which is effective in keeping animals away from the structure. Power for the electronic guard comes from the DC power supply of the assembly.

During installation, the curb sections defining the sides and ends 3 and 4, respectively of the base 1 are assembled on-site, obviating the need for concrete mixing and heavy equipment. The base provides adequate mass to ensure stability of the remainder of the assembly, and can readily be re-levelled should the base soil move due to settling. Moreover, the base 1 can easily be removed for re-use at the same or another location. The steel frame 2 mounted on the base 1 is preferably formed of C-channel skid base reinforced by tubular steel crossbars. The rigid frame 2 also defined a bale facilitating the lifting of the entire assembly.

As mentioned above, the use of sockets 20 and 21 or 40 on the base 1 of the assembly facilitates the erection of the masts and makes it easy to access components for cleaning on servicing.

The components housed in the box 35 include an inexpensive, off-the-shelf microprocessor requiring minimal power for operation. Measured data is fed into and stored in the remote telecommunications unit in the box 35. The unit typically has the capacity to store seven days of data which is a form of back up in the event of a communications failure. At a gas well site, well data is forwarded to and flow rates are calculated by a host computer. This is a significant departure from conventional practice, because source data at the host computer can be stored indefinitely. Typically, with existing methods, the flow rate is calculated at the remote telecommunications unit using source data at the time the data is collected, and the data is discarded. Retained source data is useful when adjustments are required, e.g. because an instrument drifts out of calibration.

I claim:

1. A remote telecommunications assembly comprising a modular skeletal base for installation at a monitoring site, said base including a plurality of narrow concrete curb sections for defining a pair of sides and a pair of ends, said sides and ends being interconnectable, whereby the base is rectangular with a hollow center; a skeletal frame for mounting on said base; a power supply for mounting on said frame; a remote telecommunications unit for mounting on said frame; and an antenna for mounting on said frame for receiving and transmitting signals from said remote telecommunications unit.

2. The remote telecommunications assembly of claim 1, wherein said concrete curb sections include complementary shoulders at each end thereof, whereby the ends of the curb sections can form lap joints with each other when assembled.

3. The remote telecommunications assembly of claim 2, wherein said frame includes a rectangular bottom section of substantially the same length as said base, a post for carrying said remote telecommunications unit; a mast for carrying said antenna; and a socket on said frame carrying said mast.

4. The remote telecommunications assembly of claim 2, including a pair of masts, one mast carrying said remote telecommunications unit and the other mast carrying said antenna; and a crossbar interconnecting said masts.

5. The remote telecommunications assembly of claim 4 wherein said frame includes a rectangular bottom section of substantially the same length as said base, and a pair of sockets on the bottom section carrying said masts.

6. The remote telecommunications assembly of claim 2, wherein said frame includes a cruciform bottom section; and a socket at the center of said bottom section for supporting a mast; said mast carrying a remote telecommunications unit enclosure, a solar panel and an antenna.

7. The remote telecommunications assembly of claim 1 including a skeletal guard railing around said frame for preventing damage to the assembly by livestock.

8. The remote telecommunications assembly of claim 7, wherein said guard railing includes corner posts and horizontal rails defining a frusto-pyramidal enclosure for the frame of the assembly.

9. The remote telecommunications assembly of claim 8, including a gate in one end of said guard railing.

* * * * *